Feb. 7, 1950     R. J. DUNLAVEY     2,496,448
PROJECTOR LENS MOUNTING WITH
ADJUSTING AND LOCKING MEANS
Filed May 6, 1946
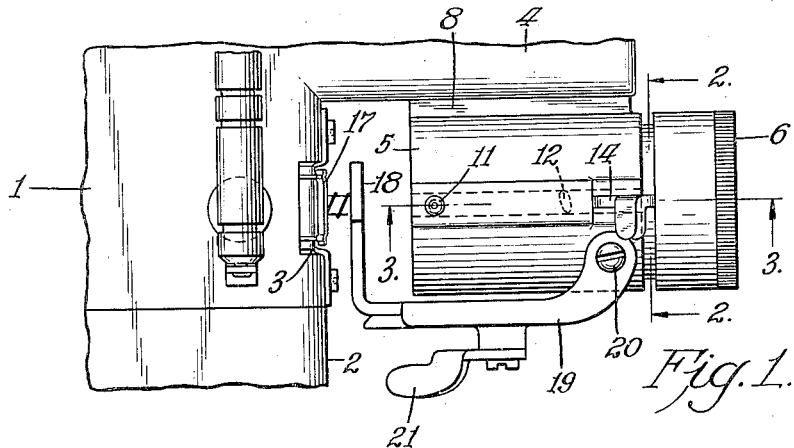
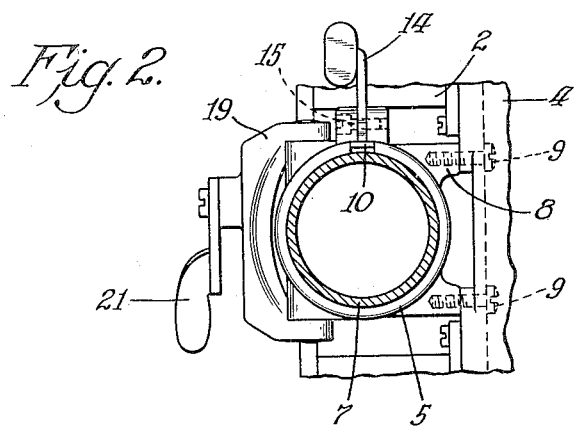
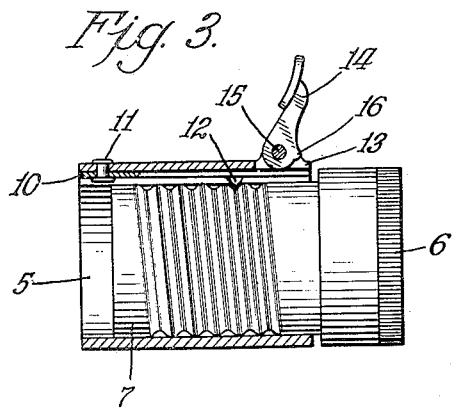
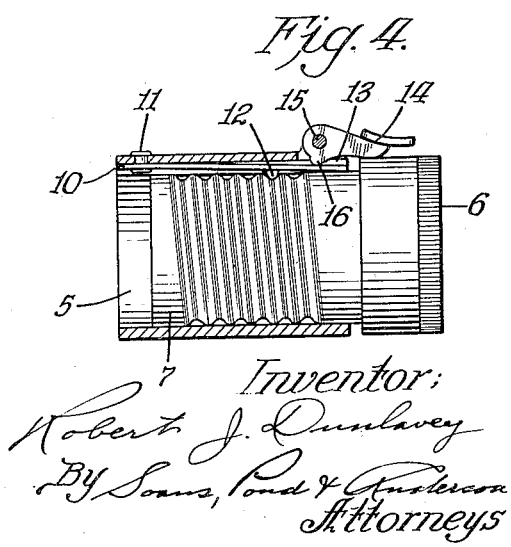
Inventor:
Robert J. Dunlavey
By Soans, Pond & Anderson
Attorneys Patented Feb. 7, 1950

2,496,448

UNITED STATES PATENT OFFICE 2,496,448

PROJECTOR LENS MOUNTING WITH ADJUSTING AND LOCKING MEANS

Robert J. Dunlavey, Chicago, Ill., assignor to Ampro Corporation, Chicago, Ill., a corporation of Illinois Application May 6, 1946, Serial No. 667,685

6 Claims. (Cl. 88—57)

1

The main objects of this invention are to provide an improved lens mounting which will permit a lens supported therein to be shifted axially as well as rotated for accomplishing a quick rough adjustment and a fine adjustment of the lens; to provide improved means for locking the lens in adjusted position; and to provide an improved lens mounting of this kind which is particularly adapted for use in cinematographs.

An illustrative embodiment of this invention is shown in the accompanying drawings, wherein:

Figure 1 is a fragmentary top plan view of a cinematograph having an improved lens mounting;

Figure 2 is a transverse vertical section, taken on the line 2—2 of Figure 1;

Figure 3 is a longitudinal vertical section of the lens mounting taken on the line 3—3 of Figure 1; the lens being shown in elevation and the locking clamp being shown in open position; and Figure 4 is a view similar to Figure 3 but showing the locking clamp in closed position.

Inasmuch as this invention relates particularly to the lens mounting, the accompanying drawings show only as much of the projector as will be of assistance in apprehending the invention.

Cinematographs generally include an upright casing having a rear compartment for housing the usual light bulb and a forward compartment in which is mounted a rotatable light interceptor arranged directly behind a light aperture in the film guideway. The film is fed intermittently through the guideway by suitable feeding means for momentarily positioning each picture directly in front of the light aperture.

In the construction shown, the improved lens mounting is applied to a cinematograph comprising a casing 1, having a front wall 2 provided with the usual film guideway 3, and a side wall 4 which extends forwardly for supporting the improved lens mounting 5, in which is adjustably supported the usual lens 6 having an externally threaded ferrule 7.

The improved mounting is in the form of a tubular shell having an internal diameter slightly greater than the external diameter of the threaded ferrule 7. Formed on one side of the mounting, is a boss 8 which is secured to the side wall 4 by a pair of screws 9.

Located within the shell, is a longitudinally extending leaf spring 10, having one end thereof secured to the shell by a rivet 11. On the inner face of the spring, is a shoulder 12 which is normally urged into engagement with the externally threaded ferrule of the lens so as to permit the lens to be rotated for accomplishing its fine adjustment.

The spring permits retraction of the shoulder 12 when the lens is roughly adjusted by its axial movement.

Mounted in an opening 13 in the top of the shell, is a cam lever 14 pivoted on a pin 15 and having a cam surface 16 adapted to ride on the leaf spring 10 for urging the shoulder 12 and the outer end of the spring into frictional engagement with the ferrule of the lens to lock the lens in its adjusted position within the mounting.

To permit adjustment of the lens, the lever 14 is raised as shown in Figure 3. For a quick rough adjustment, the lens is shifted axially, during which movement the shoulder 12 rides over the threads of the ferrule. For a final fine adjustment, the lens is rotated. To lock the lens in its adjusted position, the lever 14 is depressed so as to force the spring 10 and shoulder 12 into frictional engagement with the ferrule.

Supported on the lens mounting is a movable film gate which forms the subject of my copending application Serial Number 667,684, filed May 6, 1946, now Patent No. 2,443,950, dated June 22, 1948. This film gate comprises a yieldable tension shoe 17 supported on a bracket 18 which is slidably mounted on a lever 19 which is pivotally secured to the lens mounting by a pin 20. The film tension shoe 17 is moved toward and away from the film guideway 3 by means of an arm 21.

Although but one specific embodiment of this invention has been herein shown and described it will be understood that details of the construction shown may be altered without departing from the spirit of the invention as defined by the following claims.

I claim:

1. In a device of the class described, including a lens having an externally threaded ferrule, and a mounting comprising a shell having a bore for receiving the lens ferrule; retractable means having a thread engaging portion extending into said bore said thread-engaging portion being adapted to cooperate with the ferrule threads to permit screw adjustment of the lens by its rotation, and a clamp mounted on said shell and having a part projecting into said bore and adapted to move said retractable means into frictional engagement with the ferrule to lock the lens against rotative and axial movement.

2. In a device of the class described, including a lens having an externally threaded ferrule, and a mounting comprising a shell having a smooth bore for receiving the lens ferrule; a leaf spring mounted on said shell within the bore, a shoulder on said spring adapted to yieldably engage the ferrule threads to permit adjustment of the lens, and a cam lever pivotally mounted on said shell and having a cam surface extending into said bore for engaging said spring to move said shoulder into frictional engagement with the ferrule to secure the lens against movement.

3. In a device of the class described, including a lens having an externally threaded ferrule, and a mounting comprising a shell having a smooth bore for receiving the lens ferrule; a leaf spring mounted on said shell within the bore, a shoulder on said spring adapted to yieldably engage the ferrule threads to permit adjustment of the lens, and a cam lever pivotally mounted on said shell and having a cam surface extending into said bore for engaging said spring to move said spring into frictional engagement with the ferrule to secure the lens against movement.

4. In a device of the class described, including a lens having an externally threaded ferrule, and a mounting comprising a shell having a smooth bore for receiving the lens ferrule; a channel in the shell extending axially of the mounting and lens and opening into the bore, a leaf spring mounted in said channel, a shoulder on said spring adapted to yieldably engage the ferrule threads to permit adjustment of the lens, and a cam lever pivotally mounted on the shell outwardly of the leaf spring and having a cam surface extending into the channel for engaging said spring to move said shoulder into frictional engagement with the ferrule to secure the lens against movement.

5. In a device of the class described, including a lens having an externally threaded ferrule, and a mounting comprising a shell having a smooth bore for receiving the lens ferrule; a channel in the wall of the shell opening into the bore and extending axially thereof, a leaf spring arranged within the channel and secured at one of its ends to the shell, a shoulder on the spring spaced from its secured end and adapted to project into the bore to engage the threaded ferrule and to be received in the channel to permit adjustment of the lens, and a cam lever pivotally mounted on the shell and having a cam surface extending into the channel on the outward side of the spring and at a location spaced axially from the shoulder for engaging the spring to move said shoulder into frictional engagement with the ferrule to secure the lens against movement.

6. In a device of the class described, including a lens having an externally threaded ferrule and a mounting comprising a shell having a bore for slidably and rotatably receiving the lens ferrule; a retractable member in said bore for engaging the ferrule threads, resilient means urging said retractable member into engaging relation with the threads of the ferrule, and lock means manually movable between a position maintaining said retractable member in locking frictional engagement with the ferrule to prevent rotative and axial movement of the latter and a position permitting retraction of said member against force exerted by said resilient means.

ROBERT J. DUNLAVEY.

REFERENCES CITED

The following references are of record in the file of this patent:

UNITED STATES PATENTS

| Number | Name | Date |
|---|---|---|
| 421,647 | Ambrose | Feb. 18, 1890 |
| 556,174 | Bateman | Mar. 10, 1896 |
| 1,649,646 | Badgley | Nov. 15, 1927 |
| 1,780,945 | Sapier | Nov. 11, 1930 |
| 1,848,253 | Howell | Mar. 8, 1932 |
| 2,373,052 | Rausch | Apr. 3, 1945 |